United States Patent [19]

Lauder

[11] 4,126,580

[45] * Nov. 21, 1978

[54] STABLE PEROVSKITE CATALYSTS

[75] Inventor: Alan Lauder, Newark, Del.

[73] Assignee: E. I. Du Pont de Nemours and Company, Wilmington, Del.

[ * ] Notice: The portion of the term of this patent subsequent to Jul. 29, 1992, has been disclaimed.

[21] Appl. No.: 750,637

[22] Filed: Dec. 15, 1976

Related U.S. Application Data

[63] Continuation-in-part of Ser. No. 566,108, Apr. 8, 1975, abandoned, which is a continuation-in-part of Ser. No. 463,988, Apr. 25, 1974, abandoned, which is a continuation-in-part of Ser. No. 405,052, Oct. 10, 1973, Pat. No. 3,897,367.

[51] Int. Cl.$^2$ .......................... B01J 21/04; B01J 23/10; B01J 23/56; B01J 23/58

[52] U.S. Cl. .................................. 252/462; 252/463; 252/465; 252/466 A; 252/466 B; 252/467; 252/470; 252/471; 252/472; 252/474; 423/213.2; 423/213.5

[58] Field of Search ................. 252/462, 466 PT, 472, 252/463, 465, 466 B, 467, 470, 471, 474

[56] References Cited

U.S. PATENT DOCUMENTS

| | | | |
|---|---|---|---|
| 3,900,428 | 8/1975 | Mai et al. ............................ | 252/462 |
| 3,901,828 | 8/1975 | Mai et al. ............................ | 252/462 |
| 3,907,968 | 9/1975 | Kobylinski et al. ............... | 423/213.5 |

*Primary Examiner*—W. J. Shine

[57] ABSTRACT

Perovskite catalysts of the general formula $ABO_3$ having increased stability through the incorporation of metals having low first ionization potentials, and their use in oxidation and reduction reactions.

13 Claims, No Drawings

STABLE PEROVSKITE CATALYSTS

CROSS REFERENCE TO RELATED APPLICATIONS

This is a continuation-in-part of copending application Ser. No. 566,108, filed Apr. 8, 1975, and now abandoned which was a continuation-in-part of application Ser. No. 463,988, filed Apr. 25, 1974, also now abandoned, which was a continuation-in-part of copending application Ser. No. 405,052, filed Oct. 10, 1973, now U.S. Pat. No. 3,897,367.

BACKGROUND OF THE INVENTION

Recent concern over the the environmental effects of industrial and automotive emissions has resulted in increased effort to develop catalysts which are effective in the oxidation or reduction of undesirable waste gases to innocuous products. In addition to the fundamental need for good catalytic activity for the desired conversions, catalysts have been sought which retain this catalytic activity over extended periods of time in environments which are normally detrimental to the catalytic effect of many metals such as platinum. Most platinum catalysts, for example, are markedly depreciated in their catalytic activity in the presence of combustion residues from standard antiknock gasoline additives. Moreover, many industrial processes, such as those found in petroleum refining, provide high temperatures or reducing conditions detrimental to most known catalysts.

SUMMARY OF THE INVENTION

The present invention relates to perovskite catalysts having improved stability in a wide variety of chemical environments.

Specifically, the present invention provides, in a catalyst metal oxide having the general formula $ABO_3$ and a perovskite crystal structure, in which A and B are each at least one metal cation, the improvement wherein
  (a) the Lattice Stability Index of the metal oxide is less than about 12.3 electron volts;
  (b) at least about 1% of the type B cation sites are occupied by cations of at least one catalytic metal from Groups 5B, 6B, 7B, 8 and 1B of the periodic table; and
  (c) at least about 10% of the type B cation sites are occupied by cations of at least one metal differing from the catalytic metal and having a first ionization potential of no greater than 7.1 electron volts.

The invention further provides a process using these catalysts by bringing into contact at least one oxidizable and at least one reducible reactant in the presence of a catalyst and under such conditions as to effect a change in the oxidation state of at least one reactant.

DETAILED DESCRIPTION OF THE INVENTION

The catalytic metal oxides to which the present invention relates have the general empirical formula $ABO_3$ containing substantially equal numbers of metal cations occupying the A sites and the B sites in the perovskite crystalline structure. In the ideal perovskite structure such oxides contain cations of appropriate relative sizes and coordination properties and have cubic crystalline forms in which the corners of the unit cubes are occupied by the larger A site cations, each coordinated with 12 oxygen atoms, the centers of the cubes are occupied by the smaller B site cations, each coordinated with six oxygen atoms, and the faces of the cubes are occupied by oxygen atoms. Variations and distortions of this fundamental cubic crystal structure are known among materials commonly considered to be perovskites or perovskite-like. Distortions of the cubic crystal structure of perovskite and perovskite-like metal oxides include rhombohedral, orthorhombic, psuedocubic, tetragonal, and pseudotetragonal modifications.

The A site metals used in the preparation of such perovskite compositions can be from the periodic table groups 1A, 1B, 2A, 2B, 3B, 4A, 5A lanthanide rare earth metals (atomic numbers 58 through 71) and from the actinide rare earth metals (atomic numbers 90 through 104). Particularly satisfactory perovskite compositions are obtained using A site metals from Groups 1A, 2A, 3B and the lanthanide rare earth metals.

The B site cations can be present in any amount and valence which are consistent with the perovskite crystal structure of the compounds. Accordingly, they can have valences of 1 to 7 and can be from the periodic table groups 1A, 1B, 2A, 2B, 3A, 3B, 4A, 4B, 5A, 5B, 6B, 7B and 8 or from the lanthanide and actinide rare earth metals.

The cations of type A generally have ionic radii of about from 0.8 to 1.65Å, while the cations of type B can have ionic radii of about from 0.4 to 1.4Å. References to ionic radii are based on the tabulations of Shannon and Prewitt, ACTA CRYST. B25 925 (1969) and B26 1046 (1970). References to the periodic table refer to that given at pages 448–449, "Handbook of Chemistry and Physics," 40th Edition, Chemical Rubber Publishing Company (1958–59).

The present invention is based on the discovery that catalysts having excellent stability can be obtained through the combined use of the perovskite crystal structure and the inclusion of metals within the crystalline structure having a low first ionization potential such that the Lattice Stability Index of the compositions is less than about 12.3 electron volts. Particularly stable compositions are obtained when the Lattice Stability Index is less than about 12.15 or especially less than about 12.0 electron volts (cf. Example 9 with Examples 11 and 12, Table III, below). The Lattice Stability Index is the sum of the products of the atomic fractions of each metal cation in a compound and the first ionization potential of the metal. By first ionization potential is meant that given by Vendeneyev et al. "Bond Energies, Ionization Potentials and Electron Affinities", St. Martin's Press (1966).

The term "atomic fraction" is used in its usual sense, indicating the fraction of the type A or type B cation sites occupied by a metal. Thus, for the composition $[Sr_{0.1} La_{0.9}] [Al_{0.9} Ru_{0.1}]O_3$, the atomic fractions of the four metal cations are 0.1, 0.9, 0.9 and 0.1, respectively.

In calculating the Lattice Stability Index of the composition, the atomic fraction of each cation is multiplied by the first ionization potential of the metal from which the cation is formed. These products are then added together.

It is important that a significant amount of a stabilizing metal be present in the type B cation sites of the present compositions for good stability of the products. Accordingly, at least about 10% of the type B cation sites should be occupied by cations of at least one stabilizing metal having a first ionization potential no greater than 7.1 electron volts. For maximum stability, B site stabilizing component should be separate from and in addition to the catalyst transition metal present in the B site. Representative stabilizing metals which can be used for this purpose include the following:

| Metal | First Ionization Potential |
|---|---|
| Aluminum | 5.984 |
| Gallium | 6.00 |
| Indium | 5.785 |
| Titanium | 6.82 |
| Zirconium | 6.84 |
| Hafnium | 7 |
| Chromium | 6.764 |
| Vanadium | 6.74 |
| Molybdenum | 7.10 |
| Niobium | 6.88 |

In addition, to satisfy the Lattice Stability Index requirements of the present compositions, at least a significant amount, for example, about 20% of the cation sites of type A or type B are generally occupied by ions of at least one of the following metals:

| Metal | First Ionization Potential |
|---|---|
| Lithium | 5.39 |
| Sodium | 5.138 |
| Potassium | 4.339 |
| Rubidium | 4.176 |
| Calcium | 6.11 |
| Strontium | 5.692 |
| Barium | 5.210 |
| Scandium | 6.54 |
| Yttrium | 6.38 |
| Lanthanum | 5.61 |
| Lanthanide rare earth mixtures | 5.6–6.9 |

The Lattice Stability Index of the present composition is particularly reduced by the inclusion of alkali metal in amounts comprising at least about 10% of the type A or type B cation sites.

In the present catalytic compositions, at least about 1% of the type B cation sites are occupied by a catalytic transition metal selected from groups 5B, 6B, 7B, 8 and 1B of the periodic table. Improved catalytic performance is realized from the first row transition metals having an atomic number of from 24 to 29, and especially good performance is obtained using at least one of the platinum metals, rhodium, ruthenium, palladium, osmium, irridum, and platinum. The catalytic effect of the platinum metal generally increases until these metals occupy about 20% of the B cation sites. Incrementally less improvement is realized above these levels. The platinum metals ruthenium and platinum have been found to provide especially high catalytic activity. When transition metals having an atomic number of 24–29 are used, it is preferred, for best catalytic properties effect, that at least about 5% of such transition metals be present in a first valence and at least about 5% of the same metal be present in a second valence. In addition, when these metals are used without a platinum metal, at least about 10% should be incorporated into the composition. It has also been found to be of catalytic benefit for these transition metals of atomic number 24–29 to be used in conjunction with a platinum metal.

The first ionization potentials of the catalytic metals used in the invention are as follows. All catalytically active metals tend to increase the LSI value:

| | | |
|---|---|---|
| V 6.74 | Cu 7.724 | Pt 9.0 |
| Cr 6.764 | Ru 7.364 | Au 9.22 |
| Mn 7.432 | Rh 7.46 | Re 7.87 |
| W 7.98 | Pd 8.33 | Mo 7.10 |

-continued

| | | |
|---|---|---|
| Fe 7.87 | Ag 7.574 | Nb 6.88 |
| Co 7.86 | Os 8.7 | Ta 7.88 |
| Ni 7.633 | Ir 9 | Tc 7.28 |

The catalytic compounds of the present invention can be prepared by heating mixtures of metal oxides, hydroxides, metals and/or metal salts for sufficient times at temperatures which permit spontaneous formation of the compounds. The mixture of materials which are heated are preferably finely subdivided and intimately mixed before heating and are thoroughly ground and mixed by any conventional techniques several times during the heating period, since the compounds are in many instances formed by atomic diffusion, without melting of any of the starting or potential intermediate materials, and are subject to coating of unreacted particles by reaction products. The heating times and temperatures required for the formation of significant amounts of these compounds depend upon the particular compositions being formed, the required times usually being shorter at higher temperatures. Temperatures above about 800° C. are usually suitable for the formation of these compounds but temperatues above about 900° C. are often preferred with firing times of hours to days with occasional intermediate grinding and mixing, and temperatures of 1000° C. to 1500° C. can generally be used.

In forming the compounds used in this invention, stoichiometric mixtures of starting materials are preferably heated in air or other oxygen-containing gas mixtures.

The perovskite compositions of the invention can be used as catalysts in the form of free-flowing powders, for example, in fluid-bed reaction systems, or in the form of shaped structures providing efficient contact between the catalyst and reactant gases. The catalyst compositions can contain minor or major amounts of catalytically inert materials, with the catalytic compositions primarily on the surfaces of the inert material or dispersed throughout. For example, the powdered compounds can be formed into porous catalyst pellets in which they are dispersed throughout by conventional techniques employing pellet presses, rolling mixer or extruders. Dispersants, lubricants, and binders are often used in conjunction with the preparation of such pellets.

One particularly useful dispersant-binder for use in forming extruded pellet catalyst structures containing the catayst compositions described herein is a high-purity alpha alumina monohydrate sold by the Continental Oil Co. as "Dispal". This material is a white, free-flowing powder of small particle size formed of very fine ultimate crystallites having a surface area of about 200 square meters per gram and a bulk density of 45 to 50 pounds per cubic foot. It forms thixotropic dispersions at concentrations of about 3 to 30% in water containing about 4 to 6% commercial concentrated (37% HCl) hydrochloric acid based on the weight of alumina, which dispersions become thicker upon standing. Thick dispersions containing about 20 to 30 parts of the alumina monohydrate and about 100 to 150 parts of acidified water per 100 parts of a catalytic composition having a surface area of about two square meters per gram can be extruded through small orifices to obtain structures which retain their form when wet and have significant strength when dried of gross water and heated at about 500° C. to about 900° C. to remove at least a part of the water present in the alumina monohydrate.

The catalytic composition of this invention are preferably used in the form of coatings on suitable refractory supports. Such supports can be composed solely or primarily of silica, of ceramic compositions having softening or melting temperatures above the temperatures involved in forming or coating these catalytic compositions on such supports, of natural silicious materials such as diatomaceous earths and pumice, as well as of alundum, gamma alumina, silicon carbide, titania, zirconia, and other such refractory materials.

The compounds can be applied to the supports in any convenient manner. For example, they can be formed upon supports which are sufficiently high melting and nonreactive by soaking the support structure in a solution of a suitable mixture of salts, drying, and firing the impregnated support to a temperature and for a time sufficient to form the catalytic structure. Alternately, the compounds can be preformed and applied to the support structure in a slurry which can optionally contain diluent materials which can also be catalytic materials. A particularly useful dispersant-binder for use in such slurry-coating processes is the "Dispal" alpha alumina monohydrate described above for making extruded catalyst structures. Typically, acidified dispersions containing about 4 to 10% alpha alumina hydrate and a comparable amount of the ground catalytic composition are prepared, pieces of the support material are coated with the dispersion, the coated pieces are dried, and the dried coated pieces are heated to a temperature and for a time (e.g., for 2 to 24 hours at 500° C. to 900° C.) to remove at least a portion of the water from the alpha alumina monohydrate. Other support materials and techniques for applying catalytic materials to supports, useful and effective with the compounds of this invention, are described by Sowards and Stiles in U.S. Pat. No. 3,518,206 and by Aarons in U.S. Pat. No. 3,554,929. To provide significant catalytic activity, the catalyst powder should be applied to the surface of the support in an amount sufficient to coat the entire surface, usually in an amount of from 2 to 25% by weight of the support.

The catalytic compositions of the present invention are stable and durable at high temperatures and can be used for a wide variety of liquid and gas-phase reactions. They are particularly effective in the catalyzation of the oxidation of hydrocarbons and carbon monoxide and also the reaction between nitrogen oxide ($NO_x$) and carbon monoxide to give nitrogen and carbon dioxide. They exhibit increased resistance to poisoning by the lead compounds present in the exhaust of internal compustion engines operated on leaded gasoline.

The metal catalysts of this invention are useful as catalysts for the oxidation of oxidizable carbon components to compounds of higher oxidation states, the reduction of carbon monoxide and of nitrogen oxides to compounds of lower oxidation states and the reduction of hydrocarbyl mercaptans and sulfides to substantially sulfur-free hydrocarbon compositions.

Among the oxidation processes for which the present catalysts can be used is the oxidation of carbon monoxide to carbon dioxide and of hydrocarbons to carbon dioxide. Hydrocarbons which can be used include those having 1-20 carbon atoms, including those that are normally gaseous and those that can be entrained in a gaseous stream such as the liquefied petroleum gases and the volatile aromatic, olefinic and paraffinic hydrocarbons which are commonly in industrial solvents and in fuels for internal combustion engines. The oxidant for these processes can be oxygen, nitrogen oxides, such as No and $NO_2$, which components are normally present in the exhaust gases of internal combustion engines.

The compounds of this invention can also be used to catalyze the reduction of such oxides of nitrogen as nitric oxide, nitrogen dioxide, dinitrogen trioxide, dinitrogen tetroxide and the higher oxides of nitrogen such as may be present in waste gases from the production and use of nitric acid as well as in the exhaust gases of internal combustion engines. The reductant for these processes can be hydrogen, carbon monoxide and such hydrocarbons as described above and as present in said exhaust gases.

The metal catalysts of this invention containing ruthenium are particularly useful as catalysts for the reduction of nitrogen oxides. They generally catalyze the reduction of these oxides to innocuous compounds (e.g., nitrogen) instead of to ammonia. Metal catalysts containing platinum and palladium are particularly useful as catalysts for the complete oxidation of carbon compounds to carbon dioxide.

Thus the compositions of this invention are useful for the oxidation of carbon monoxide and volatile hydrocarbons and for the simultaneous reduction of oxides of nitrogen under conditions typical of those involved in the cleanup of the exhaust gases of automotive and other internal combustion engines are are capable of effecting the substantially complete conversion of the obnoxious components of such gases to innocuous substances.

Still another hydrocarbon oxidation process that can be catalyzed by metal catalysts of this invention is the steam reforming of hydrocarbons. This process known also as hydrocarbon reforming involves reaction of methane or a homolog thereof such as those found in volatile naphthas with steam in the presence of a catalyst of the invention. Those containing Ni or Co or a platinum metal selected from Pd, Pt, Ir, Ru and Rh supported on alumina, magnesia, or a basic oxide composition are particularly well suited for this application. The resulting product stream contains CO and $H_2$, normally accompanied by $CO_2$ formed by reaction of CO with excess steam in the well-known water gas shift. Reaction temperatures are normally in the range 450° to 1000° C., usually not above 900° C., at pressures up to about 700 psi and usually at least about 100 to 200 psi for methane reforming at reactant ratios of from about 1.5 to 6 moles of steam per carbon in the hydrocarbon feed stock.

The metal catalysts of this invention can also be used in the water gas shift reaction which involves reaction of CO with $H_2O$ (steam) at moderately elevated temperatures. Particularly suitable are those catalysts containing cations of the first transition metal series, such as Fe, Co, Ni or Cu, preferably Fe or Cu. The resulting product-stream is depleted in CO and containing $CO_2$ and $H_2$. Temperatures in general are in the 200° to 500° C. range, with higher conversions favored at the lower temperatures, high reaction rates at the higher temperatures. The process appears to be largely independent of pressure.

Still another hydrocarbon oxidation process that can be catalyzed by metal catalysts as described herein is the dehydrogenation of aliphatic, cycloaliphatic and alkylaromatic hydrocarbons having 4 to 12 carbon atoms and at least two saturated (i.e., nonolefinic and nonaromatic) —CH— groups which are adjacent or in 1,6-positions relative to one another (corresponding to said first oxidation state) to hydrocarbons, usually of the same carbon content, formed by removal of the hydrogens from one or more pairs of said —CH— groups (corresponding to said second oxidation state). Included are the dehydrogenation of such aliphatic hydrocarbons as butane and 2-methylbutane to such olefins and diolefins as butene, 2-methylbutene, butadiene and 2-methylbutadiene; cyclodehydrogenation of alkanes having removable hydrogens as defined and preferably having six —CH— groups in a chain, such as n-hexane, 2,3- and 4-methylhexane, n-heptane and various methylheptanes to the corresponding cyclohexanes, including methyl-substituted cyclohexanes; dehydroaromatization of cyclohexane and the methyl-substituted cyclohexanes to benzenoid hydrocarbons such as benzene, toluene and the xylenes; dehydroaromatization of decaline to naphthalenes; dehydrogenation of alkyl side chains of alkylbenzenes such as ethylbenzene to form styrene.

Reaction conditions generally involve temperatures in the range of 400° to 700° C. and solid catalysts as described herein, particularly those containing Group VIII platinum metals, especially Pt. The reaction can be conducted in the presence of oxygen or in the absence of oxygen and in the presence of hydrogen gas as in the well-known catalytic reforming process of the petroleum refining industry.

In the important catalytic reforming process of the petroleum refining industry, a relatively low octane value feed stream containing dehydrocyclizable and aromatizable hydrocarbons is converted into a relatively high octane value exit stream containing aromatic hydrocarbons of the gasoline boiling range as the essential components resulting primarily from dehydrocyclization of open-chain components to cyclohexanes and aromatization of cyclohexanes. Accompanying reactions include hydrocracking to lower carbon content components and isomerization of straight-chain to higher octane value branched-chain components. The process is generally carried in the presence of hydrogen to suppress side reactions lead to carbonization and to produce a composition which is largely saturated except for the aromatic hydrocarbon content.

The feed stream normally comprises alkanes and cycloalkanes having 4-12 carbons, preferably 5-10 carbons, and including (a) one or more open-chain compounds having 6-8 carbons and at least six —CH— groups in a chain, such as n-hexane, n-heptane and the methyl-substituted derivatives thereof described above, and/or preferably (b) one or more cyclopentanes having 1-3 methyl substituents on different ring carbons, such as methylcyclopentane, 1,2-dimethyl-, 1,3-dimethyl- and 1,2,4-trimethylcyclopentane, which are isomerizable into cyclohexane and methyl-substituted cyclohexanes, hence aromatizable into the corresponding benzenoid hydrocarbons. A typical feed stream composed as above will have a research octane number in the range 40-85, more usually 50-70.

The reforming reaction is normally conducted at about 450° to 550° C. and at pressures of about 200 to 900 psi and if desired in the presence of added hydrogen gas in amounts corresponding to 3-15 moles per mole of feed to minimize side reactions.

The product stream comprises the so-called reformate fraction, rich in high octane value aromatics, such as benzene, toluene and the xylenes and having a typical research octane number in the 88-103 range, accompanied by an essentially saturated gaseous fraction rich in $C_1$-$C_4$ alkanes and hydrogen gas, a valuable by-product for use in various hydrotreating processes, e.g., hydrodesulfurization.

Still further processes that can be catalyzed in accordance with this invention are those Fischer-Tropsch reactions involving the reduction of carbon monoxide with hydrogen in the presence of a catalyst as defined, particularly those containing Fe, Co, Ni, or Ru at elevated temperatures (usually 150° to 600° C.) and pressures (up to 15000 psi) effective to produce one or more products containing chemically bound C and H with or without chemically bound O such as methane or one or more gaseous, liquid or solid higher hydrocarbons, with or without alcohols, aldehydes, ketones and fatty acids. One embodiment comprises the well-known methanation reaction generally conducted at about 200° to 600° C. at elevated pressures, typically about 50 to 500 psi, preferably over a Ni-containing metal oxyhalide catalyst of this invention. Suitable feed streams include the product stream from the steam reforming of methane, containing CO, $H_2$, unreacted steam and some $CO_2$ formed in the water gas shift. Another embodiment widely used for the production of liquid fuels in the gasoline and diesel fuel ranges involves reaction of CO with $H_2$ at relatively low temperatures, such as 150° to 400° C. and pressures in the range of about 15 to 300 psi, preferably over metal oxides containing Fe or Co ions, which promote the formation of hydrocarbons higher than $CH_4$, especially the liquid fractions suitable as fuels for internal combustion engines. The reaction products may sometimes include partially reduced, i.e., oxygenation products such as alcohols, aldehydes, ketones, and carboxy acids, as produced in accordance with the Fischer-Tropsch process variation known as the synthol process.

Another reduction process catalyzed by catalyzed defined herein is the catalytic desulfurization of hydrogenalysis of organic divalent sulfur compounds, such as those naturally occurring in feed stocks used in the petroleum chemical industry, for example, those used for the production of synthesis gas (CO and $H_2$) by steam reforming as described earlier, which stocks include mercaptans, linear sulfides, cyclic sulfides and the aromatic cyclic sulfide thiophene.

The feed stock desulfurization reaction is normally conducted at temperatures of 150°-500° C., preferably 300°-400° C., over a wide range of pressures, including atmospheric, in the presence of a cobalt catalyst and in the presence of a large excess of $H_2$ relative to the sulfur content of the feed stock, typical proportions being 0.25 to 1.0 mole of $H_2$ per average mole of feed stock hydrocarbon corresponding generally to 250-1000 mole of $H_2$ per S atom in the feed.

The reaction product comprises hydrogen sulfide gas and a substantially sulfur-free hydrocarbon composition. The $H_2S$ can be removed by means described in the art, as by physical stripping or by chemical absorption, e.g., by ZnO to produce ZnS.

In a reducing atmosphere and elevated temperature typical of many gas phase reactions, the compositions of the present invention exhibit excellent resistance to structural decomposition, as indicated by an absence of a significant decrease in weight of the composition. X-ray diffraction analysis demonstrates little change in the crystalling structure of the compounds of the present invention after heating to 1000° C., while compounds having a Lattice Stability Index in excess of 12.3 showed decomposition of the crystalline structure as shown by the presence of metallic noble metal after heating. Moreover, the compositions of the present invention exhibit significantly less tendency to react with other compositions commonly used as catalyst supports at high temperature.

The invention is further illustrated by the following specific examples, in which parts and percentages are by weight unless otherwise indicated.

EXAMPLES 1-14

In Examples 1-14 and comparative Examples A-Q, metal oxides were prepared by heating mixutres of precursor compounds containing appropriate stoichiometric amounts of the metals involved. The mixtures of precursor compounds were obtained by one of the following preparation procedures, as indicated in Table I:

Procedure A: Dry metal oxides and/or carbonates were ground together.

Procedure B: An aqueous potassium carbonate solution was added to a solution of soluble compounds (e.g. metal nitrates, chloroplatinic acid, ruthenium chloride hydrate) and the resulting insoluble materials were separated, washed, and dried.

Procedure C: An aqueous potassium carbonate solution was added to an aqueous slurry of a powdered metal oxide (e.g. ruthenium oxide) in a solution of soluble compounds (e.g. metal nitrates) and the resulting insoluble materials were separated, washed, and dried.

Procedure D: An aqueous potassium carbonate solution was added to an aqueous solution of soluble compounds (e.g. metal nitrates), a powdered metal oxide (e.g. platinum oxide, vanadium oxide) was added, and the insoluble materials were separated, washed, and dried.

Procedure E: An aqueous potassium carbonate solution was added to an aqueous solution of soluble compounds (e.g. metal nitrates), the resulting insoluble materials were separated, washed, dried and ground, an insoluble metal oxide (e.g. thorium oxide) was added, and the mixture was heated at 950° C. for 2 hours, cooled, and ground.

Procedure F: An aqeuous solution of soluble compounds (e.g. metal nitrates) was evaporated to dryness, the residue was ground and heated at 950° C. for 1 hour, and the heated material was cooled, ground, washed with water, and dried.

The mixtures of precursor compounds were heated in air at 950° to 1300° C. for several days with occasional cooling, grinding, and mixing. Each of the resulting metal oxide compositions was finely ground and passed through a 325-mesh Tyler standard sieve screen. The metal oxides were identified as having the expected perovskite structure. The metal oxides of the present invention prepared in Examples 1-8 were applied to supports by the following procedure. One part of "Dispal" M alumina dispersant and binder (obtained from the Continental Oil Company; surface area about 164 square meters per gram, determined with nitrogen by the Brunauer-Emmett-Teller method) was mixed with 17 parts of water containing a few drops of commercial concentrated hydrochloric acid. To this mixture was added 7.5 parts of the catalytic composition to obtain a stable thixotropic slurry. A cylinder of "Torvex" alumina ceramic honeycomb with straight-through cells (obtained from E. I. du Pont de Nemours & Company) was soaked in water. This cylinder weighed about 6 to 7 grams, was about 2.5 centimeters in diameter and thickness and nominally had a cell size of 1/16 inch, wall thickness of 0.018 inch, open area of 50%, 253 hexagonal holes per square inch, and a nominal geometric surface area of 462 square feet per cubic foot. The water-soaked cylinder was dipped into the slurry of the catalytic composition, the gross excess of slurry was removed by blowing the cylinder with air, the cylinder was dried, and the cylinder coated with the catalytic composition and binder was heated for about 30 minutes in air in a muffle furnance at about 700° C. The cylinder was again soaked in water, dipped into the slurry, blown free of excess slurry, and dried and then heated in air at about 700° C. for 2 hours. The percentage increase in weight of the cylinder due to the adherent catalytic composition and binder is given in Table I.

TABLE I

Preparation of Metal Oxides

| Example | Lattice Stability Index | Metal Oxide | Preparation Procedure | Percent on Support |
|---|---|---|---|---|
| 1 | 11.42 | $[K][Nb_{0.9}Pt_{0.1}]O_3$ | A | 20.3 |
| A | 11.59 | $LaAlO_3$ | A | — |
| 2, 2a | 11.74 | $[Sr_{0.1}La_{0.9}][Al_{0.9}Ru_{0.1}]O_3$ | A | 16.2 |
| 3 | 11.77 | $[Sr_{0.04}La_{0.96}][Al_{0.9}Co_{0.08}Ru_{0.02}]O_3$ | B | 21.6 |
| 4 | 11.80 | $[Sr_{0.2}La_{0.8}][Al_{0.8}V_{0.2}]O_3$ | D | 18.8 |
| 5 | 11.86 | $[Ba_{0.1}La_{0.9}][Al_{0.9}Pt_{0.1}]O_3$ | A | 12.1 |
| 6, 6a | 11.89 | $[Sr_{0.2}La_{0.8}][Al_{0.8}Ru_{0.2}]O_3$ | A | 22.2 |
| 7 | 11.90 | $[Sr_{0.1}La_{0.9}][Al_{0.9}Pt_{0.1}]O_3$ | F | 22.7 |
| 8 | 11.95 | $[Sr_{0.06}La_{0.94}][Al_{0.8}Co_{0.16}Ru_{0.04}]O_3$ | B | 15.4 |
| 9 | 12.03 | $[Sr_{0.3}La_{0.7}][Al_{0.7}Ru_{0.3}]O_3$ | A | — |
| 10 | 12.08 | $[Ba][Ti_{0.9}Ru_{0.1}]O_3$ | A | — |
| 11 | 12.17 | $[Sr_{0.4}La_{0.6}][Al_{0.6}Ru_{0.4}]O_3$ | A | — |
| 12 | 12.18 | $[K_{0.2}La_{0.8}][Cr_{0.9}Ru_{0.1}]O_3$ | C | — |
| 13 | 12.24 | $[Ba][Ti_{0.9}Pt_{0.1}]O_3$ | A | — |
| 14 | 12.30 | $[Ba][Ti_{0.8}W_{0.1}Pd_{0.1}]O_3$ | A | — |
| B | 12.33 | $[Sr_{0.5}La_{0.5}][Al_{0.5}Ru_{0.5}]O_3$ | A | — |
| C | 12.41 | $[Sr_{0.2}La_{0.8}][Al_{0.5}Ni_{0.4}Ru_{0.1}]O_3$ | B | — |
| D | 12.47 | $[Sr_{0.6}La_{0.4}][Al_{0.4}Ru_{0.6}]O_3$ | A | — |
| E | 12.47 | $[Sr][Ti_{0.5}Mn_{0.4}Pt_{0.1}]O_3$ | A | — |
| F | 12.62 | $[Sr_{0.7}La_{0.3}][Al_{0.3}Ru_{0.7}]O_3$ | A | — |
| G | 12.76 | $[Sr_{0.8}La_{0.2}][Al_{0.2}Ru_{0.8}]O_3$ | A | — |
| H | 12.91 | $[Sr_{0.9}La_{0.1}][Al_{0.1}Ru_{0.9}]O_3$ | A | — |
| I | 13.03 | $[Ca_{0.2}La_{0.8}][Cr_{0.5}Fe_{0.5}]O_3$ | B | — |
| J | 13.06 | $[Sr][Co_{0.5}Nb_{0.5}]O_3$ | A | — |
| K | 13.06 | $SrRuO_3$ | — | — |
| L | 13.24 | $LaNiO_3$ | B | — |
| M | 13.24 | $[Th_{0.1}La_{0.9}][Fe_{0.8}Al_{0.2}]O_3$ | E | — |
| N | 13.39 | $[Sr_{0.2}La_{0.8}][Co_{0.8}Ru_{0.2}]O_3$ | A | — |

TABLE I-continued

| | | Preparation of Metal Oxides | | |
|---|---|---|---|---|
| Example | Lattice Stability Index | Metal Oxide | Preparation Procedure | Percent on Support |
| O | 13.40 | $[Sr_{0.2}La_{0.8}][Co_{0.9}Ru_{0.1}]O_3$ | B | — |
| P | 13.43 | $[Sr][Nb_{0.1}Co_{0.7}Ru_{0.2}]O_3$ | A | — |
| Q | 13.51 | $[Sr_{0.5}La_{0.5}][Co]O_3$ | B | — |

The catalytic activity of these compositions in the reduction of nitric oxide by carbon monoxide was determined. The "Torvex" ceramic honeycomb cylinder coated with the catalytic composition and binder was installed in a stainless steel chamber with a nominal internal diameter of 2.5 centimeters, height of 2.5 centimeters, and volume of 12.3 cubic centimeters. Nitrogen containing about 2000 parts per million of nitric oxide and about 10,000 parts per million of carbon monoxide was passed through the chamber at a nominal hourly space velocity of about 40,000 hr.$^{-1}$ and pressure of 1 pound per square inch gage while the feed gas and the catalyst chamber were heated so that the temperature of the gas entering the catalyst chamber increased from about 60° C. to about 600° C. over about 90 minutes. Samples of the inlet and exit gases were obtained periodically. The nitric oxide in these samples was oxidized to nitrogen dioxide. The resulting gas mixture was analyzed and the percent reduction in the nitric oxide concentration of the gas upon passing through the catalyst chamber was calculated. A smooth plot was made of the degree of conversion of nitric oxide at different catalyst chamber inlet temperatures for each catalytic composition. From a smooth curve through each plot, temperatures were estimated for "light-off" (the intercept with the temperature axis of an extrapolation of the portion of the curve at which the degree of conversion changed rapidly with temperature) and for nitric oxide conversions of 25%, 50%, and 90%. The catalyst temperature was higher than the catalyst bed inlet temperature with all the catalytic compositions at nitric oxide conversions greater than about 25%. The estimated temperatures for "light-off" and for 25%, 50%, and 90% conversion of nitric oxide before and after heating the catalyst-coated honeycomb cylinders for 100 hours at about 900° C. are given in Table II.

The catalytic activity of the "Torvex" cylinders coated with the catalytic composition and binder in the oxidation of carbon monoxide was determined in a similar apparatus and by a similar procedure. Nitrogen containing about 10,000 parts per million of carbon monoxide and 10,000 parts per million of oxygen was passed through the catalyst chamber and the entering and exiting gas mixtures were analyzed chromatographiclly using a column containing granules of "Linde" 13X molecular sieve. The estimated temperatures for "light-off" and for 25%, 50%, and 90% conversion of carbon monoxide before and after heating the catalyst-coated honeycomb cylinders for 100 hours at about 900° C. are given in Table II.

The catalytic activity of the "Torvex" cylinders coated with the catalytic composition in the oxidation of propane was determined in a similar apparatus and by a similar procedure. Nitrogen containing about 1300 parts per million of propane and 8800 parts per million of oxygen was passed through the catalyst chamber and the entering and exiting gases were analyzed chromatographically using a column containing 80–100 mesh "Poropak" Q. The temperatures for "light-off" and for 25%, 50%, and 90% conversion of propane before and after heating the catalyst-coated honeycomb cylinders for 100 hours at about 900° C. are given in Table II.

TABLE II

| | Catalytic Activity | | | | | | | | | | | | | | | |
|---|---|---|---|---|---|---|---|---|---|---|---|---|---|---|---|---|
| Example: | 1 | | 2 | | 3 | | 4 | | 5 | | 6 | | 7 | | 8 | |
| Hours at 900° C: | 0 | 100 | 0 | 100 | 0 | 100 | 0 | 100 | 0 | 100 | 0 | 100 | 0 | 100 | 0 | 100 |
| Reduction of Nitric Oxide | | | | | | | | | | | | | | | | |
| "Light-off" temp., °C | 295 | 325 | 200 | 290 | 295 | 370 | 340 | 375 | 285 | 295 | 300 | 200 | 290 | — | 265 | 290 |
| 25% conversion, °C | 340 | 405 | 250 | 325 | 335 | 405 | 410 | 510 | 370 | 355 | 325 | 280 | 325 | — | 300 | 330 |
| 50% conversion, °C | 380 | 490 | 305 | 355 | 380 | 445 | 480 | 590 | 425 | 415 | 345 | 325 | 375 | — | 335 | 370 |
| 90% conversion, °C | 550 | — | 380 | 410 | 445 | 525 | 595 | — | 490 | 500 | 385 | 380 | 460 | — | 385 | 435 |
| Oxidation of Carbon Monoxide | | | | | | | | | | | | | | | | |
| "Light-off" temp., °C | 255 | 305 | 245 | 220 | 310 | 300 | 325 | 365 | 250 | 320 | 230 | 205 | 190 | — | 195 | 270 |
| 25% conversion, °C | 290 | 325 | 265 | 300 | 330 | 355 | 365 | 405 | 265 | 335 | 300 | 225 | 275 | — | 245 | 300 |
| 50% conversion, °C | 320 | 350 | 285 | 325 | 355 | 380 | 420 | 450 | 280 | 350 | 330 | 240 | 295 | — | 275 | 325 |
| 90% conversion, °C | 365 | 390 | 315 | 355 | 430 | 410 | 540 | — | 305 | 380 | 370 | 265 | 320 | — | 325 | 375 |
| Oxidation of Propane | | | | | | | | | | | | | | | | |
| "Light-off" temp., °C | 500 | 380 | 310 | 340 | 360 | — | 400 | — | 255 | 315 | 275 | 263 | 200 | — | 305 | 405 |
| 25% conversion, °C | 575 | — | 340 | 430 | — | — | — | — | 350 | 410 | 470 | 370 | 265 | — | 380 | 480 |
| 50% conversion, °C | — | — | 355 | 510 | — | — | — | — | 405 | 510 | 540 | 430 | 300 | — | 410 | 555 |
| 90% conversion, °C | — | — | 410 | — | — | — | — | — | — | — | — | 505 | — | — | 510 | — |

| | Catalytic Activity | | | | | | | |
|---|---|---|---|---|---|---|---|---|
| Example: | 10 | | 12 | | 13 | | | 14 |
| Hours at 900° C: | 0 | 100 | 0 | 100 | 0 | 100 | 0 | 100 |
| Reduction of Nitric Oxide | | | | | | | | |
| "Light-off" temp., °C | 280 | 280 | 200 | 405 | 280 | 360 | 305 | 280 |
| 25% conversion, °C | 320 | 335 | 225 | 460 | 265 | 420 | 355 | 410 |
| 50% conversion, °C | 345 | 385 | 255 | 530 | 420 | 475 | 405 | 495 |
| 90% conversion, °C | 390 | 495 | 300 | — | 485 | — | 485 | — |
| Oxidation of Carbon Monoxide | | | | | | | | |
| "Light-off" temp., °C | 290 | 280 | 235 | 210 | 265 | 235 | 185 | 290 |
| 25% conversion, °C | 325 | 315 | 305 | 355 | 290 | 285 | 240 | 300 |
| 50% conversion, °C | 340 | 340 | 345 | 460 | 310 | 320 | 270 | 315 |
| 90% conversion, °C | 545 | 460 | 555 | — | 335 | 360 | 315 | 340 |
| Oxidation of Propane | | | | | | | | |
| "Light-off" temp., °C | 410 | 535 | 350 | 350 | 205 | 350 | 480 | 425 |
| 25% conversion, °C | — | — | 530 | 525 | 240 | 525 | 565 | 505 |

TABLE II-continued

| | | | | | | | | |
|---|---|---|---|---|---|---|---|---|
| 50% conversion, °C | — | — | — | — | 270 | 575 | — | —. |
| 90% conversion, °C | — | — | — | — | — | — | — | — |

The stability of catalytic compositions of the present invention and of comparative examples was tested in a Stability Index greater than 12.3 by the appearance of metallic noble metal after heating.

TABLE III

Stability of Metal Oxides in a Reducing Atmosphere

| | | | Change in Weight (Based on Weight at 50–200° C) | | | | | |
|---|---|---|---|---|---|---|---|---|
| | | | Increase | | Decrease | | | |
| Example | Lattice Stability Index | Metal Oxide | Temp. Range °C | % | Temp. Range °C | % | Total % | Direction of Change at 1000° C |
| A | 11.59 | $LaAlO_3$ | 325–620 | 0.3 | 100–325 | 0.6 | 0.8 | None |
| | | | | | 670–710 | 0.4 | | |
| 2 | 11.74 | $[Sr_{0.1}La_{0.9}][Al_{0.9}Ru_{0.1}]O_3$ | None | None | 100–400 | 0.8 | 1.0 | None |
| | | | | | 600–960 | 0.3 | | |
| 2a | 11.74 | $[Sr_{0.1}La_{0.9}][Al_{0.9}Ru_{0.1}]O_3$ | None | None | 300–360 | 0.7 | 2.4 | None |
| | | | | | 620–690 | 0.8 | | |
| | | | | | 740–790 | 1.0 | | |
| 4 | 11.80 | $[Sr_{0.2}La_{0.8}][Al_{0.8}V_{0.2}]O_3$ | None | None | 530–800 | 1.0 | 1.0 | None |
| 5 | 11.86 | $[Ba_{0.1}La_{0.9}][Al_{0.9}Pt_{0.1}]O_3$ | 430–560 | 0.4 | 560–1000 | 0.6 | Nil | None |
| 6a | 11.89 | $[Sr_{0.2}La_{0.8}][Al_{0.8}Ru_{0.2}]O_3$ | None | None | 300–590 | 0.9 | 2.1 | None |
| | | | | | 590–800 | 1.3 | | |
| 9 | 12.15 | $[Sr_{0.3}La_{0.7}][Al_{0.7}Ru_{0.3}]O_3$ | None | None | 280–690 | 2.0 | 3.0 | Decrease |
| | | | | | 850–1000 | 1.0 | | |
| 11 | 12.15 | $[Sr_{0.4}La_{0.6}][Al_{0.6}Ru_{0.4}]O_3$ | 690–810 | 0.4 | 400–690 | 1.4 | 3.7 | Rapid Decrease |
| | | | | | 810–1000 | 2.8 | | |
| 12 | 12.15 | $[K_{0.2}La_{0.8}][Cr_{0.9}Ru_{0.1}]O_3$ | 300–600 | 1.0 | 600–720 | 0.7 | 3.0 | Rapid Decrease |
| | | | 720–820 | 0.2 | 820–1000 | 3.6 | | |
| 13 | 12.24 | $[Ba][Ti_{0.9}Pt_{0.1}]O_3$ | 310–780 | 0.7 | 100–310 | 0.5 | 1.8 | Slight Decrease |
| | | | | | 780–1000 | 2.0 | | |
| 14 | 12.33 | $[Sr_{0.5}La_{0.5}][Al_{0.5}Ru_{0.5}]O_3$ | 700–830 | 0.8 | 340–700 | 1.9 | 6.2 | Rapid Decrease |
| | | | | | 830–1000 | 5.1 | | |
| B | 12.41 | $[Sr_{0.2}La_{0.8}][Al_{0.5}Ni_{0.4}Ru_{0.1}]O_3$ | None | None | 50–350 | 2.5 | 8.3 | Decrease |
| | | | | | 500–1000 | 5.8 | | |
| C | 12.47 | $[Sr_{0.6}La_{0.4}][Al_{0.4}Ru_{0.6}]O_3$ | 700–850 | 1.3 | 350–700 | 1.9 | 7.5 | Rapid Decrease |
| | | | | | 850–1000 | 6.8 | | |
| F | 12.62 | $[Sr_{0.7}La_{0.3}][Al_{0.3}Ru_{0.7}]O_3$ | 700–900 | 2.0 | 350–650 | 1.3 | 4.1 | Rapid Decrease |
| | | | | | 900–1000 | 4.8 | | |
| G | 12.76 | $[Sr_{0.8}La_{0.4}][Al_{0.2}Ru_{0.8}]O_3$ | 690–900 | 3.0 | 200–690 | 0.9 | 4.2 | Rapid Decrease |
| | | | | | 900–1000 | 6.4 | | |
| H | 12.91 | $[Sr_{0.9}La_{0.1}][Al_{0.1}Ru_{0.9}]O_3$ | 700–920 | 3.2 | 200–250 | 0.3 | 1.1 | Rapid Decrease |
| | | | | | 920–1000 | 3.8 | | |
| I | 13.03 | $[Ca_{0.2}La_{0.8}][Cr_{0.5}Fe_{0.5}]O_3$ | 350–620 | 2.0 | 290–350 | 0.9 | 4.2 | Rapid Decrease |
| | | | | | 620–1000 | 5.4 | | |
| K | 13.06 | $SrRuO_3$ | 600–870 | 3.4 | 870–1000 | 4.2 | 0.8 | Rapid Decrease |
| L | 13.24 | $LaNiO_3$ | 110–220 | 0.7 | 30–120 | 1.3 | 12.2 | Slight Decrease |
| | | | | | 220–500 | 0.7 | | |
| | | | | | 500–700 | 2.2 | | |
| | | | | | 700–1000 | 8.6 | | |
| M | 13.24 | $[Th_{0.1}La_{0.9}][Fe_{0.8}Al_{0.2}]O_3$ | None | None | 100–500 | 1.8 | 2.7 | None |
| | | | | | 650–1000 | 0.9 | | |
| N | 13.39 | $[Sr_{0.2}La_{0.8}][Co_{0.8}Ru_{0.2}]O_3$ | None | None | 270–320 | 0.1 | 8.6 | None |
| | | | | | 460–700 | 1.3 | | |
| | | | | | 700–800 | 2.7 | | |
| | | | | | 800–900 | 0.7 | | |
| | | | | | 900–950 | 3.0 | | |
| O | 13.40 | $[Sr_{0.2}La_{0.8}][Co_{0.9}Ru_{0.1}]O_3$ | 380–690 | 1.3 | 150–250 | 0.6 | 10.5 | None |
| | | | | | 250–380 | 2.7 | | |
| | | | | | 690–800 | 5.4 | | |
| | | | | | 850–920 | 0.5 | | |
| | | | | | 920–970 | 2.7 | | | reducing atmosphere. Samples of about from 20 to 110 milligrams of each of the metal oxides listed in Table III were heated to 1000° C. in a Du Pont Model 950 Thermogravimetric Analyzer in an atmosphere containing 1% hydrogen, 4% carbon monoxide, and 95% nitrogen. The indicated atmospheric percentages are by volume and the atmosphere was flowing at a rate of 30 milliliters per minute. The temperature was increased in a programmed manner at a rate of 10° C. per minute. The resulting changes in weight shown in Table III indicate the stability of the crystal structures, the smaller changes in weight indicating greater compositional stability under the experimental conditions. X-ray diffraction patterns obtained before and after heating the metal oxides to 1000° C., indicate a disruption of the crystal structures of those metal oxides having a Lattice The stability of selected oxides was tested with support materials representative of those commonly used as catalyst supports.

Equal parts by weight of finely ground portions of the metal oxides listed in Table IV were mixed separately with finely ground cordierite (a magnesium aluminum silicate having the approximate composition $2MgO.2Al_2O_3.5SiO_2$) and with finely ground quartz silica. The mixtures were heated at 1000° C. for 1 hour on alumina plates (separate experiments showed no reaction of the metal oxides with alumina) and then finely ground. The extent of reaction of the metal oxides with cordierite and with silica based on comparisons of the X-ray diffraction patterns of the ground mixtures before and after heating is summarized in Table IV. The color changes observed during heating of the mixtures containing silica are also shown in Table IV. Metal oxides having Lattice Stability Indexes of 11.86 and less showed no reaction with cordierite and less than total reaction with silica.

TABLE IV
Interaction of Metal Oxides with Cordierite and Silica

| Example | Lattice Stability Index | Metal Oxide | Extent of Reaction, Heating at 1000° C with Cordierite | Extent of Reaction, Heating at 1000° C with Silica | Color Change, Heating to 1000° C with Silica |
|---|---|---|---|---|---|
| A | 11.59 | $LaAlO_3$ | None | None | None |
| 5 | 11.86 | $[Ba_{0.1}La_{0.9}][Al_{0.9}Pt_{0.1}]O_3$ | None | Considerable | Tan to Lt. Brown |
| 13 | 12.24 | $[Ba][Ti_{0.9}Pt_{0.1}]O_3$ | Slight | Total | Tan to Grey |
| E | 12.47 | $[Sr][Ti_{0.5}Mn_{0.4}Pt_{0.1}]O_3$ | Some | Total | Brown to Tan |
| J | 13.06 | $[Sr][Co_{0.5}Nb_{0.5}]O_3$ | Considerable | Total | Grey to Blue |
| L | 13.24 | $LaNiO_3$ | Some | Total | Blue to Green |
| N | 13.39 | $[Sr_{0.2}La_{0.8}][Co_{0.8}Ru_{0.2}]O_3$ | Considerable | Total | |
| O | 13.40 | $[Sr_{0.2}La_{0.8}][Co_{0.9}Ru_{0.1}]O_3$ | Considerable | Total | Black to Blue-grey |
| P | 13.43 | $[Sr][Nb_{0.1}Co_{0.7}Ru_{0.2}]O_3$ | Some | Total | Black to Blue |
| Q | 13.51 | $[Sr_{0.5}La_{0.5}][Co]O_3$ | Some | Total | Black to Blue |

EXAMPLE 15

The catalytic activity of the composition of Example 5 in the oxidation of exhaust gases from an internal combustion engine was determined. Six cylinders of "Torvex" alumina ceramic honeycomb were coated with a mixture of "Dispal" M alumina dispersant and the compositions of Example 5 as described above. These cylinders were each about 5.0 centimeters in diameter and 2.5 centimeters long and weighed about 24 to 28 grams. The total weight of alumina and the composition of Example 5 applied to these cylinders averaged about 16.7 percent of the weight of the dry uncoated cylinders.

These six peices of "Torvex" alumina ceramic honeycomb coated with catalyst were mounted in an insulated stainless steel chamber bolted to the exhaust port of a "Kohler" Model K91 single cylinder gasoline engine (8.86 cubic inch displacement, nominally 4 horsepower) fitted with an electronic spark ignition system and loaded with a heavy fan. The engine was operated at 3000 revolutions per minute at an air/fuel ratio of approximately 15.4 which resulted in exhaust gas containing approximately 1% excess oxygen, using an unleaded premium grade gasoline to which was added 2.0 grams per gallon of lead as "Motor Mix" tetraethyllead antiknock compound containing the usual amounts of ethylenedichloride and ethylenedibromide scavengers and a commercial premium grade heavy duty SAE 40 grade lubricating oil containing a typical combination of additives including phosphorus, sulfur, etc. The engine was overhauled at intervals. Under these operating conditions, the exhaust gas temperature was 660° to 700° C. (typically 690° C.), the nominal gas hourly space velocity of exhaust gas through the catalyst chamber was about 18,000 hr $^{-1}$, and the exhaust gas contained about 1% carbon monoxide, 0.1% nitrogen oxides, and 1.5% oxygen, and the temperature of the catalyst was typically 850° C. The nitrogen oxides were determined as described above and the carbon monoxide and oxygen were determined chromatographically after condensing most of the water in the exhaust gas in a trap cooled by an ice bath and passing the remaining gas through a small-pore filter to remove entrained particulate matter.

Initially and after each 100 hours of steady state operation under these conditions, the air/fuel ratio was increased to obtain in the exhaust gas about three percent excess oxygen, defined as Excess $O_2$ (%) = Measured $O_2$ (%) − 0.5 [Measured CO (%)]

The engine and catalyst were allowed to come to temperature equilibrium and the conversions of carbon monoxide were determined. This procedure was repeated with stepwise reduction of the air/fuel ratio until the exhaust gas contained about three percent excess carbon monoxide, defined as Excess CO (%) = Measured CO (%) − 2 [Measured $O_2$ (%)]

The conversions of carbon monoxide thus determined at 100-hour intervals for 800 hours were plotted. The conversions with an exhaust gas containing 1% excess oxygen determined from the resulting graphs is in Table V. These conversions illustrate the effectiveness of the compositions of Example 5 in catalyzing the oxidation of carbon monoxide in the exhaust gases from an internal combustion engine, even with periodic operation of the engine under conditions producing exhaust gases which tend to reduce the oxidation states of metals in such compositions, and the resistance of this composition to poisoning by the lead compounds and other combustion residues present in such exhaust gases from engines operated on leaded gasolines.

TABLE V
Catalytic Activity With Automotive Exhaust Gases

| Hours Exposure | Percent Conversion of Carbon Monoxide With 1% Excess Oxygen |
|---|---|
| 0 | 85 |
| 100 | 92.5 |
| 200 | 85 |
| 300 | 83 |
| 400 | 85 |
| 500 | 88 |
| 600 | 82 |
| 700 | 67 |
| 800 | 72 |

I claim:

1. In a catalytic metal oxide having the general formula $ABO_3$ and a perovskite crystal structure, in which A and B are each at least one metal cation in sites of type A and of type B, respectively, wherein:
    (1) the type A cation sites are occupied by metals each having an ionic radius between 0.8 and 1.65 Å;
    (2) the type B cation sites are occupied by metals each having an ionic radius between 0.4 and 1.4 Å; and
    (3) substantially equal numbers of metal cations occupy the sites of type A and of type B, the improvement wherein:
(a) the Lattice Stability Index of the metal oxide is less than about 12.0 electron volts;
(b) at least about 1% of the type B cation sites are occupied by cations of at least one catalytic metal of the platinum group or having an atomic number of from 24 to 29; and
(c) at least about 10% of the type B cation sites are occupied by cations of at least one metal differing from the catalytic metal and having a first ionization potential of no greater than 7.1 electron volts.

2. A catalytic metal oxide of claim 1 wherein the catalytic metal is a platinum group metal occupying no more than about 20% of the type B cation sites.

3. A catalytic metal oxide of claim 1 wherein at least about 10% of the type B cation sites are occupied by cations of a metal having an atomic number of 24 to 29.

4. A catalytic metal oxide of claim 1 wherein cations of an alkali metal occupy at least about 10% of the type A or type B cation sites.

5. A catalytic metal oxide of claim 1 wherein 1 to 20% of the type B cation sites are occupied by ruthenium or platinum.

6. A catalytic metal oxide of claim 1 wherein at least 1% of the type B cation sites are occupied by at least one metal of the platinum group and at least 1% of the type B cation sites are occupied by at least one metal having an atomic number of from 24 to 29.

7. A catalytic metal oxide of claim 1 wherein aluminum ions occupy at least about 10% of the type B cation sites.

8. A catalytic metal oxide of claim 1 having the formula $$[Sr_{0.1}La_{0.9}][Al_{0.9}Ru_{0.1}]O_3.$$

9. A catalytic metal oxide of claim 1 having the formula $$[Ba_{0.1}La_{0.9}][Al_{0.9}Pt_{0.1}]O_3.$$

10. A catalytic metal oxide of claim 1 having the formula $$[Sr_{0.06}La_{0.94}][Al_{0.8}Co_{0.16}Ru_{0.04}]O_3.$$

11. A catalytic metal oxide of claim 1 having the formula $$[Sr_{0.3}La_{0.7}][Al_{0.7}Ru_{0.3}]O_3.$$

12. A catalytic composition of claim 1 on a shaped support.

13. A catalytic composition of claim 11 wherein the shaped support is alumina.

* * * * *